Patented June 7, 1927.

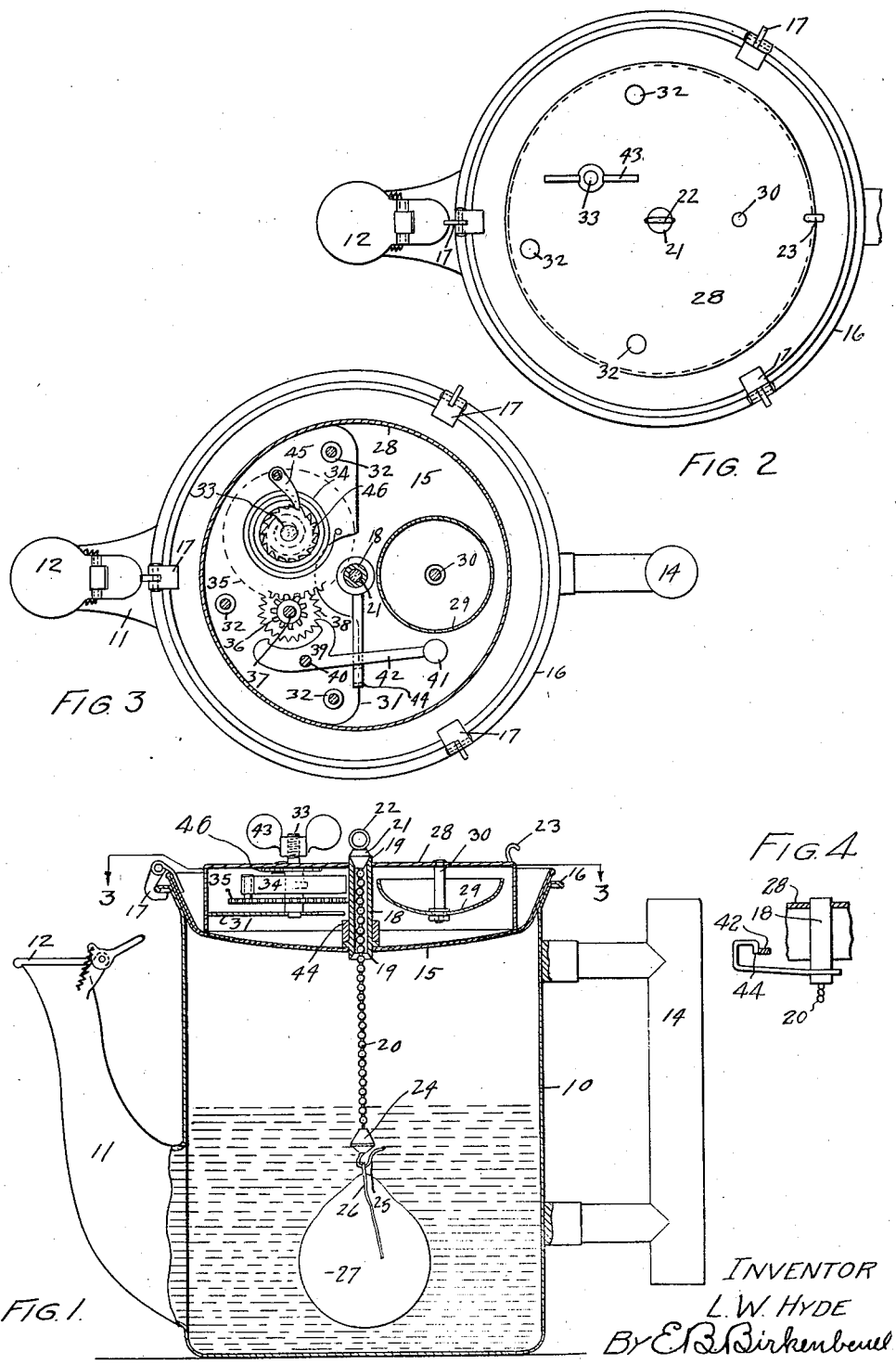

1,631,486

UNITED STATES PATENT OFFICE.

LEON W. HYDE, OF HILLSBORO, OREGON.

COFFEEPOT.

Application filed October 28, 1925. Serial No. 65,324.

This invention relates generally to the art of coffee making, and particularly to a special form of coffee pot in which all of the desirable flavors are retained during the process of infusion and no undesirable reactions are set up within the container itself.

The first object of this invention is to provide an exceedingly simple and efficient form of coffee pot wherein the more volatile flavors which ordinarily escape in the process of percolating, or boiling coffee, are retained and form a part of the drink being made.

The second object is to prevent the breaking down of various elements in the coffee in a manner to produce a drink which is muddy in appearance and poor in flavor.

The third object is to provide a special announcing device whereby the housewife will be notified when the process of coffee making has reached a stage where further application of heat is undesirable.

These, and other objects, will become more apparent from the specification following as illustrated in the accompanying drawing, in which:

Figure 1 is a vertical section through the device of which Figure 2 is a plan and Figure 3 a horizontal section taken along the line 3—3 in Figure 1.

Figure 4 is a fragmentary section taken along the line 4—4 in Figure 3.

Similar numbers of reference refer to the same parts throughout the views.

Referring in detail to the drawing, the device itself consists of a cylindrical container 10 having a spout 11 on whose discharge end is placed a hinged cap 12 provided with a spring 13 adapted to hold the cap tightly over the mouth of the spout 11 or out of the way, as when pouring coffee. This cap also acts as a relief valve for any abnormal pressures which may develop within the container 10, as, for instance, if the housewife should fail to cut off the supply of heat when notified that the desired temperature had been reached.

A handle 14 is attached to the container 10 in any convenient manner. The lid for the container 10 is composed of a bi-metallic disk 15 whose curved rim 16 can be held tightly in place by means of the clamps 17. In the center of the member 15 is secured a tube 18 which passes through the member 15. The upper and lower ends 19 of the tube 18 are flared outwardly. Passing through the tube 18 is a chain 20 to whose upper end is fastened a plug 21 provided with a ring 22 adapted to engage the hook 23 and be held thereby. On the lower end of the chain 20 is fastened a second plug 24 on whose under side is a hook 25 to which can be attached the string 26 of a coffee bag 27 in which is held the ground coffee.

It will be understood that this element can be replaced with a metallic basket if desired, without departing from the spirit of this invention.

Mounted across the top of the member 15 is a cover plate 28 through which the tube 18 slidably passes. On the under side of the plate 28 is mounted an announcing bell 29 by means of a post 30. A second plate 31 is placed under the plate 28 and is spaced therefrom by means of the pillars 32. Journaling in the plates 28 and 31 is a shaft 33 on which is secured a spring 34 and a loose main wheel 35 which meshes with a pinion 36 on the shaft 37 of the escape wheel 38. The outer end of the spring 34 is attached to the wheel 35.

An escape lever 39 is mounted on the pivot 40 and a hammer 41 is secured to the arm 42 of the lever 39. A winding key 43 is placed on the shaft 33. A suitable pawl 45 and ratchet wheel 46 are interposed between the shaft 33 and the plate 28. A stop 44 is mounted on the side of the tube 18 and is projected across the path of the arm 42 whenever the temperature within the container 10 does not cause the bi-metallic disk 15 to bulge upwardly.

The operation of the device is as follows: A quantity of ground coffee is placed within the bag 27 and a string 26 is fastened to the hook 25. A proportionate amount of water is placed within the container 10 and the ring 22 is disengaged from the hook 23 and allowed to fall into position at the upper end of the tube 18, thereby sealing the tube opening.

Heat is now applied to the under side of the container 10 and when the temperature of the liquid in the container has reached the boiling point, or one or two degrees under this point, the disk 15, which has been adjusted by the manufacturer, is caused to bulge upwardly instead of downwardly. This action causes the stop 44 to be withdrawn from in front of the arm 42 and permits the hammer 41 to vibrate against the bell 29 until the spring 34 is run down, thereby announcing the fact that the grounds have been sufficiently processed and that no further heat should be applied.

The housewife hearing this announcement immediately stops the application of heat and raises the chain upwardly until the plug 24 seals the opening at the lower end of the tube 18, and then slips the ring 22 over the hook 23.

If desired, she may even raise and lower the bag 27 several times by means of the chain 20 before hanging it up to drip, as above described, for the purpose of extracting more of the flavors from the grounds.

If, for any reason, the housewife has been out of hearing of the announcer during its operation and later returns to her kitchen, one glance at the device is sufficient to show her that the announcer has functioned. This she determines by the distance which the upper end 19 of the tube 18 projects above the plate 28. If, however, during the absence of the housewife the liquid in the container 10 has been permitted to boil excessively until a considerable amount of pressure has developed within the container, no harm can possibly arise since this pressure will be relieved either at the cap 12 or by unseating the plug 21 at the upper end of the tube 18.

It is evident that coffee produced in this device must retain all of those volatile ingredients which add so greatly to the flavors of the prepared drink, and also that since the coffee is not permitted to boil even a short length of time that no injurious action can take place within the coffee itself, since the critical temperature is not passed below the boiling point.

While there are a great variety of manners in which the above mentioned objects can be attained this particular form best conveys the idea in mind, and it must be understood that it is not my intention to limit myself to this precise form or arrangement of details but that I intend to cover all such forms and modifications thereof as fall fairly within the appended claims.

I claim:

1. A coffee pot having, in combination, a container; a closure for hermetically sealing said container; a sound-producing means; and means for actuating said sound producer when the temperature of liquid in said container reaches a predetermined height.

2. A coffee pot having, in combination, a container; means for confining vapors within said container; a pressure relief means; a container for holding ground coffee within the container arranged to be raised from the outside of said container; a sound producing mechanism; and a thermostat arranged to actuate said sounding mechanism.

3. A container having a pouring spout provided with a spring-closed cap; a closure for said container; a spring-actuated sound producing device mounted on said closure; and a thermostatically operated stop for said sounder adapted to release said sounder when the contents of said container reach a predetermined temperature.

4. A container having a pouring spout provided with a closure; a cover for said container; clamps for holding said cover on said container; a thermostat formed in the bottom of said cover; a tubular post passing through said thermostat and attached thereto; an alarm mounted over said thermostat; a stop arm on said tube adapted to release said alarm when said thermostat is actuated by heat; a chain passing through said tube having a plug at each end adapted to close the opening in said tube; and a container for ground coffee suspended from said chain.

LEON W. HYDE.